(12) United States Patent
Kobayashi et al.

(10) Patent No.: US 9,156,001 B2
(45) Date of Patent: Oct. 13, 2015

(54) METHOD AND APPARATUS FOR FURTHER PURIFYING ULTRAPURE WATER

(75) Inventors: Hideki Kobayashi, Tokyo (JP); Kunihiro Hayakawa, Tokyo (JP); Masanobu Osawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 921 days.

(21) Appl. No.: 12/312,138

(22) PCT Filed: Oct. 29, 2007

(86) PCT No.: PCT/JP2007/071007
§ 371 (c)(1),
(2), (4) Date: Apr. 28, 2009

(87) PCT Pub. No.: WO2008/053826
PCT Pub. Date: May 8, 2008

(65) Prior Publication Data
US 2010/0044311 A1    Feb. 25, 2010

(30) Foreign Application Priority Data
Oct. 31, 2006   (JP) .................................. 2006-296123

(51) Int. Cl.
*B01D 25/00* (2006.01)
*B01D 61/16* (2006.01)
(Continued)

(52) U.S. Cl.
CPC .............. *B01D 61/16* (2013.01); *B01D 61/025* (2013.01); *B01D 61/027* (2013.01);
(Continued)

(58) Field of Classification Search
CPC .... B01D 15/08; B01D 15/3871; B01D 25/00; B01D 25/02; B01D 25/06; B01D 27/00; B01D 27/14; B01D 27/146; B01D 2259/804; B01D 2253/206

USPC .............. 210/638, 660, 681, 806, 251, 503, 210/748.08, 748.09, 748.1, 748.16
See application file for complete search history.

(56) References Cited

U.S. PATENT DOCUMENTS

| 4,277,332 A | * | 7/1981 | Baughn | 210/96.2 |
| 4,624,789 A | * | 11/1986 | Fan et al. | 210/661 |

(Continued)

FOREIGN PATENT DOCUMENTS

| JP | S63-065910 | 3/1988 |
| JP | H02-090991 | 3/1990 |

(Continued)

OTHER PUBLICATIONS

Sigma-Aldrich, Particle Size Conversion, http://www.sigmaaldrich.com/chemistry/stockroom-reagents/learning-center/technical-library/particle-size-conversion.html.*
Japan Patent Office, "Office Action for JP 2008-542095", Feb. 26, 2013.

*Primary Examiner* — Allison Fitzsimmons
(74) *Attorney, Agent, or Firm* — Manabu Kanesaka

(57) ABSTRACT

Disclosed are a method for further purifying ultrapure water, according to which any impurities in ultrapure water can be stably removed to a high degree within a small space over a prolonged period; and an apparatus therefor. Ultrapure water introduced into an ultrapure-water purifying apparatus 10 passes through an ion exchange resin layer 5 in a lower chamber 1a. During this process, metal ions, for example, in the ultrapure water are removed by the ion exchange resin. The ultrapure water then passes through a perforated plate 4, flows into an upper chamber 1b, and permeates an ion exchange filter 6. During this process, metal ions and other impurities remaining unremoved by the ion exchange resin layer 5 are removed. Specifically, metal ions are removed to a certain extent by the ion exchange resin, so that it is enough for the ion exchange filter provided downstream thereof to remove an extremely small amount of metal ions. Consequently, reaching of the ion exchange filter to breakthrough within a short period can be prevented, thereby attaining further purification of ultrapure water over a prolonged period of time.

13 Claims, 4 Drawing Sheets

(51) Int. Cl.
*B01D 63/14* (2006.01)
*C02F 9/00* (2006.01)
*B01D 61/02* (2006.01)
*B01D 61/14* (2006.01)
*C02F 1/00* (2006.01)
*C02F 1/32* (2006.01)
*C02F 1/42* (2006.01)
*C02F 1/44* (2006.01)
*C02F 103/04* (2006.01)

(52) U.S. Cl.
CPC .......... *B01D 61/145* (2013.01); *B01D 61/147* (2013.01); *B01D 63/14* (2013.01); *C02F 9/005* (2013.01); *B01D 2311/04* (2013.01); *B01D 2311/16* (2013.01); *C02F 1/32* (2013.01); *C02F 1/42* (2013.01); *C02F 1/444* (2013.01); *C02F 2103/04* (2013.01)

(56) References Cited

U.S. PATENT DOCUMENTS

| | | | | |
|---|---|---|---|---|
| 5,935,441 | A | * | 8/1999 | O'Neill et al. ................ 210/638 |
| 2004/0222140 | A1 | | 11/2004 | Bortnik |
| 2006/0021944 | A1 | * | 2/2006 | Carson et al. ................ 210/673 |
| 2006/0107639 | A1 | * | 5/2006 | Hamlin et al. ................ 55/498 |

FOREIGN PATENT DOCUMENTS

| | | |
|---|---|---|
| JP | H03-009798 | 2/1991 |
| JP | H03-151092 | 6/1991 |
| JP | H05-051323 | 8/1993 |
| JP | H11-099307 | 4/1999 |
| JP | 2004-82027 | 3/2004 |
| JP | 2004-154713 | 6/2004 |
| JP | 3659716 | 3/2005 |
| JP | 2005-218947 | 8/2005 |
| JP | 2006-000798 | 1/2006 |

* cited by examiner

METHOD AND APPARATUS FOR FURTHER PURIFYING ULTRAPURE WATER

FIELD OF THE INVENTION

The present invention relates to a method for further purifying ultrapure water, which has been produced by an ultrapure water production system, immediately before a point of use in an institution where the ultrapure water is to be used; and an apparatus therefor.

BACKGROUND OF THE INVENTION

With the advance of semiconductor production technology in recent years, semiconductors are to be produced with a higher and higher packing density and a smaller and smaller line width. Ultrapure water for use as a cleaning liquid in semiconductor production processes is therefore required to have contents of impurities such as trace metals and metal ions being reduced to the limit. Accordingly, strict demands are made on the techniques for removing impurities from ultrapure water to be used in the semiconductor industry.

Ultrapure water, highly purified by an ultrapure water production system, is subjected to further removal of impurities immediately before a point of use (POU) in semiconductor production processes. Filtration is the only one technique as a technique for removing impurities immediately before the point of use.

However, in an ultrapure water production system, complicated operations such as oxidization with ultraviolet rays, ion exchanging, and ultrafiltration are conducted. If complicated operations are further conducted at the point of use, therefore, the system should have an increased size. This causes problems or troubles such that an installation space for the system at the point of use is hardly allocated, a large power is required, and the system itself causes impurities such as metals and metal ions. Accordingly, a strong demand has been made to construct an apparatus and method for filtration, which require a small place and which are capable of further purifying ultrapure water to a target purity.

The most general process for removing trace metals and metal ions in water is a process of carrying out ion exchanging of metals and metal ions with a bead-like ion exchange resin or chelating resin to remove the metals and metal ions from the water.

When metals and metal ions are removed by using such a bead-like ion exchange resin, however, the metal ions are removed only at a low rate, because a speed at which the metals and metal ions diffuse into the ion exchange resin limits this rate. For providing such an ion exchange efficiency as to be usable in actual process, therefore, an apparatus for use herein should have a large size to increase the capacity of the ion exchange resin. Thus, size reduction of the filtration apparatus is difficult.

As a possible solution to these problems, there are proposed filters each including a porous membrane, such as a porous flat membrane or hollow-fiber membrane, or a non-woven fabric as a base material, in which the base material bears a functional group such as an ion exchanging group or chelating group (Japanese Unexamined Patent Application Publication No. 11-99307 and Japanese Unexamined Patent Application Publication No. 2005-218947).

A filter of this type acts to remove metal ions, because the functional group has an ability of removing metal ions. Additionally, the filter achieves a high rate of removing adsorbed molecules, because the metal ions are transported into pores of the filter by convection of ultrapure water.

However, this filter, if using a hollow-fiber membrane as the base material, causes increased cost.

The filter, if using a flat membrane as the base material, undergoes breakthrough within a short time, because the membrane thickness thereof is small, although the filter can remove metals and metal ions at a high removal rate in early stages of water passing. For avoiding this problem, the membrane is to have a larger size so as to reduce the amount of metal ions to be removed per unit membrane area. This, however, makes the filtration apparatus have a larger size. For avoiding the larger-size apparatus, two or more plies of membranes may be used. This, however, increases pressure loss.

Japanese Examined Patent Application Publication No. 3-9798 describes a treatment typically of city water with a macroreticular ion exchange resin and an ion exchange fiber.
Patent Document 1: Japanese Unexamined Patent Application Publication No. 11-99307
Patent Document 2: Japanese Unexamined Patent Application Publication No. 2005-218947
Patent Document 3: Japanese Examined Patent Application Publication No. 3-9798

As is described above, demands have been made to further improve the quality of ultrapure water. However, no technique has been found, according to which very trace amounts of metal ions contained in ultrapure water can be stably removed to a high degree within a limited space, such as one immediately before a point of use, over a prolonged period of time.

SUMMARY OF THE INVENTION

An object of the present invention is to provide a method for further purifying ultrapure water, according to which impurities contained in ultrapure water can be stably removed to a high degree within a small space over a prolonged period of time; and an apparatus therefor.

According a first embodiment, there is provided an apparatus for further purifying ultrapure water, which is connected to an ultrapure-water inlet of an institution in which the ultrapure water is to be used. The apparatus includes an ion exchange resin layer and an ion exchange filter, the ion exchange resin layer including a granular ion exchange resin, and the ion exchange filter being arranged downstream from the ion exchange resin layer and including a membrane filter having the function of ion exchanging.

In a second embodiment, there is provided the apparatus for further purifying ultrapure water, according to the first embodiment, in which the ion exchange resin has a particle diameter of 100 µm or more.

In a third embodiment, there is provided the apparatus for further purifying ultrapure water, according to the first or second embodiment, in which the apparatus further includes a housing that houses the ion exchange resin layer and the ion exchange filter.

In a fourth embodiment, there is provided the apparatus for further purifying ultrapure water, according to any one of the first to third embodiments, in which the ion exchange resin includes a cation exchange resin alone or in combination with an anion exchange resin.

In a fifth embodiment, there is provided the apparatus for further purifying ultrapure water, according to any one of the first to fourth embodiments, in which the ion exchange filter further includes a microparticle removal membrane having the function of removing microparticles, and the microparticle removal membrane is arranged downstream from the membrane filter.

In a sixth embodiment, there is provided the apparatus for further purifying ultrapure water, according to the first embodiment, in which the membrane filter having the function of ion exchanging is pleated.

In a seventh embodiment, there is provided the apparatus for further purifying ultrapure water, according to the fifth embodiment, in which the membrane filter having the function of ion exchanging and the microparticle removal membrane are superposed to form an assembly, and the assembly is pleated.

In an eighth embodiment, there is provided the apparatus for further purifying ultrapure water, according to the sixth embodiment, in which the apparatus further includes a water-permeable inner cylinder and a water-permeable outer cylinder being coaxially arranged, and the pleated membrane filter is arranged between the inner cylinder and the outer cylinder so as to surround the inner cylinder.

In a ninth embodiment, there is provided the apparatus for further purifying ultrapure water, according to the seventh embodiment, in which the apparatus further includes a water-permeable inner cylinder and a water-permeable outer cylinder being coaxially arranged, and the pleated assembly of the membrane filter having the function of ion exchanging and the microparticle removal membrane is arranged between the inner cylinder and the outer cylinder so as to surround the inner cylinder.

In a tenth embodiment, there is provided the apparatus for further purifying ultrapure water, according to the first embodiment, in which a booster pump for pressurizing water to be fed to the ion exchange resin layer is arranged.

In an eleventh embodiment, there is provided a method for further purifying ultrapure water to be fed to an institution in which the ultrapure water is to be used, the method comprising the steps of allowing ultrapure water to pass through an ion exchange resin layer including a granular ion exchange resin; and subsequently allowing the ultrapure water to pass through an ion exchange filter including a membrane filter having the function of ion exchanging.

According to the apparatus and a method for further purifying ultrapure water according to the present invention, ultrapure water can be further purified to a high degree, because metal ions are removed to a certain extent by the ion exchange resin layer, and subsequently the residual metal ions are further removed by the ion exchange filter. As metal ions are removed to a certain extent by the ion exchange resin, the ion exchange filter arranged downstream from the ion exchange resin layer has only to remove very small amounts of metal ions. This prevents the ion exchange filter from undergoing breakthrough within a short period of time, and further purification of ultrapure water can be carried out over a prolonged period of time. Additionally, since metal ions are removed by both the ion exchange resin layer and the ion exchange filter, the volume of the ion exchange resin layer can be reduced as compared to the case where metal ions are removed by an ion exchange resin layer alone, and this contributes to the size-reduction of the apparatus.

According to an embodiment of the present invention in which the ion exchange resin has a particle diameter of 100 μm or more, the pressure loss of the ion exchange resin layer is reduced, whereby a larger amount of water can pass therethrough.

According to another embodiment of the present invention in which the apparatus further includes a housing that houses the ion exchange resin layer and the ion exchange filter, the apparatus can further be downsized.

According to another embodiment of the present invention in which a cation exchange resin alone is used as the ion exchange resin, cations such as metal ions can be removed. According to another embodiment of the present invention in which a cation exchange resin and an anion-exchange resin are used in combination as a mixture, cations such as metal ions are removed by the cation exchange resin, and, in addition, anions are removed by the anion exchange resin.

The ion exchange filter for use in the present invention may further include a microparticle removal membrane having the function of removing microparticles, and the microparticle removal membrane may be arranged downstream from the membrane filter. In this embodiment, microparticles, which have not been completely removed by the ion exchange resin layer and the membrane filter, can be removed by the microparticle removal membrane.

By pleating the membrane filter or a superposed assembly of the membrane filter and the microparticle removal membrane, filtration proceeds not only a direction perpendicular to the membrane plane of the pleated membrane(s) but also in a membrane-plane direction. Specifically, the pleated membrane functions as a membrane, the height of whose pleats corresponds to the thickness of an adsorption layer of the ion exchange filter, and this prolongs the lifetime of the filter.

In another embodiment, a booster pump is arranged upstream of the apparatus for further purifying ultrapure water according to the present invention which is arranged immediately before the point of use. By arranging the booster pump in addition to pumps in a primary pure water system and a subsystem, and by suitably controlling the output of the booster pump, the ultrapure water can be fed at a predetermined pressure (required pressure).

In the case typically of a single wafer processing cleaner, ultrapure water is sprayed directly to the wafer, and the ultrapure water is thereby required to be suitably fed at a predetermined pressure.

There can be the case where the apparatus is arranged far from a clean room in which the cleaning system is placed or where the apparatus is arranged in another floor than that of the clean room. Additionally, a large amount of water is required for cleaning wafers, because recent wafers have large sizes of 300 mm in diameter and have large areas.

In consideration of these circumstances in addition to the pressure loss of the ion exchange filter, it is preferred for providing the required pressure at the point of use that a booster pump is arranged and the pressure thereof is controlled by setting the pressure of the booster pump previously suitably or by measuring the pressure at the outlet of the ultrapure-water purifying apparatus and suitably controlling the output of the booster pump based on the measured pressure.

DETAILED DESCRIPTION OF THE INVENTION

Embodiments of the present invention will be illustrated below with reference to the attached drawings. It should be noted, however, that these are not construed to limit the scope of the present invention.

Figure 1:
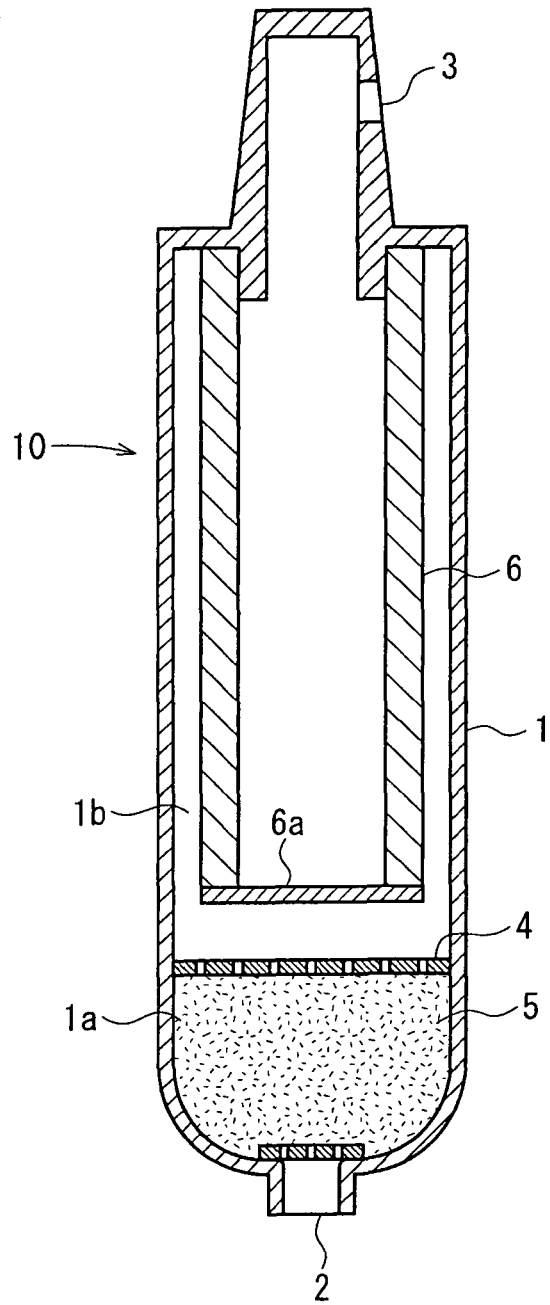
FIG. 1 is a schematic cross sectional view of an apparatus for further purifying ultrapure water according to an embodiment of the present invention.

FIG. 1 is a schematic cross sectional view of a ultrapure-water purifying apparatus 10, according to an embodiment of the present invention. This purifying apparatus 10 includes a housing 1 that is substantially cylindrical. The housing 1 has a water inlet 2 at its bottom and an outlet 3 in its upper part. The housing 1 is partitioned into a lower chamber 1a and an upper chamber 1b by a perforated plate 4.

The lower chamber 1a is filled with a bead-like ion exchange resin to constitute an ion exchange resin layer 5.

An ion exchange filter 6 is arranged in the upper chamber 1b. The ion exchange filter 6 is pleated, the lower end thereof is sealed with a seal 6a, and the upper end thereof is fixed to the housing 1. The inside of the ion exchange filter 6 communicates with the outlet 3.

The ion exchange filter 6 may be composed of a membrane filter having the function of ion exchanging, and a microparticle removal membrane having the function of removing microparticles may be arranged along the inner circumferential surface of the membrane filter. Further, a cylindrical bobbin may be arranged along the inner circumferential surface of the membrane filter or of the microparticle removal membrane so as to support the membrane filter or microparticle removal membrane.

For further purifying ultrapure water using the purifying apparatus 10 having this configuration, ultrapure water, which has been produced typically by an ultrapure water production system, is introduced through the water inlet 2 into the housing 1. The introduced ultrapure water passes through the ion exchange resin layer 5 in the lower chamber 1a. During this process, the ion exchange resin removes impurities such as metal ions from the ultrapure water.

The pure water passed through the ion exchange resin layer 5 further passes through the perforated plate, flows into the upper chamber 1b, and permeates the ion exchange filter 6 from the outer circumferential surface to the inner circumferential surface. During this process, the ion exchange filter 6 removes residual impurities such as metal ions which have not been completely removed by the ion exchange resin layer 5.

The pure water permeated the ion exchange filter 6 flows upward in a cavity inside the ion exchange filter 6 and is discharged from the outlet 3.

The ion exchange resin has a particle diameter of preferably 100 μm or more, more preferably from 100 to 1200 μm, and especially preferably from 400 to 800 μm. An ion exchange resin, if having a particle diameter of 100 μm or more, may help to reduce the pressure loss of the ion exchange resin layer and to increase the amount of water to pass therethrough. As used herein a "particle diameter" is defined in the following manner. Specifically, a particle size distribution is measured according to the method for measuring particle size distribution as specified in Japanese Industrial Standards (JIS) K-1474, and a diameter of the sieve mesh corresponding to a 50%-point cumulative particle size distribution is defined as an average diameter, and the average diameter is defined as the particle diameter.

The ion exchange resin can be, for example, an ion exchange resin for use in a polisher of an ultrapure water production system. This ion exchange resin may be a cation exchange resin alone or a mixture of a cation exchange resin and an anion exchange resin. If the specific resistance at the outlet 3 is 18 MΩ·cm or less when a cation exchange resin is used alone, the cation exchange resin is preferably used in combination with an anion exchange resin as a mixture. A cationic organic substance can be eluted from an anion exchange resin, if used in combination, but the cationic organic substance is removed by the ion exchange filter 6 arranged downstream therefrom, and thereby the cleanliness of the ultrapure water can be maintained.

The cation exchange resin is preferably one that has been conditioned typically with hydrochloric acid or nitric acid to remove contained impurities to an absolute minimum and to increase the substitutional rate with hydrogen atoms. Likewise, the anion exchange resin is preferably one that has been conditioned typically with sodium hydroxide to remove contained impurities to an absolute minimum and to increase the substitutional rate with hydroxyl groups.

In the above-mentioned embodiment, the ion exchange filter is pleated, but the shape of the ion exchange filter is not limited thereto and may be, for example, cylindrical.

The membrane filter having the function of ion exchanging may be composed of a polymer base material having a functional group. As the functional group, an ion-exchanging group or a chelating group may be used. The polymer base material should be such that the amount of substances dissolved or eluted therefrom is trivial.

Exemplary materials for the membrane filter include, but not limited to, polyolefins such as polyethylenes and polypropylenes; fluorocarbon resins such as polytetrafluoroethylenes (PTFEs), polychlorotrifluoroethylene (CTFE), tetrafluoroethylene-perfluoroalkyl vinyl ether copolymers (PFAs), and poly(vinylidene fluoride)s (PVDFs); halogenated polyolefins such as poly(vinyl chloride)s; polyamides such as nylon-6 and nylon-66; urea resins; phenolic resins; melamine resins; polystyrenes; cellulose; cellulose acetate; cellulose nitrate; poly(ether ketone)s; poly(ether ketone ketone)s; poly(ether ether ketone)s; polysulfones; poly(ether sulfone)s; polyimides; polyetherimides; polyamide-imides; polybenzoimidazoles; polycarbonates; poly(ethylene terephthalate)s, poly(butylene terephthalate)s; poly(phenylene sulfide)s; polyacrylonitriles; poly(ether nitrile)s; and copolymers of them. Without being limited to one particular material, a variety of materials can be selected according to necessity.

The membrane thickness of the membrane filter is preferably from 0.1 to 10 mm, and especially preferably from 0.5 to 10 mm. A membrane filter, if having a membrane thickness of smaller than 0.1 mm, may undergo breakthrough in early stages. In contrast, a membrane filter, if having a membrane thickness of larger than 10 mm, may show a large pressure loss, and this may reduce the amount of water that can be treated.

The membrane filter preferably has an average pore diameter of from 0.05 to 10 μm and preferably has a porosity of from 55% to 85%.

When such a membrane filter is arranged under regular conditions, it may be typically designed to have a larger membrane area in consideration of avoiding clogging. According to the present invention, however, there is no need of allowing the membrane filter to have a large membrane area, and it is enough for the membrane filter to be closely arranged to have a sufficient lifetime. This is because the object to be treated is ultrapure water, and considerable amounts of ions are removed by the ion-exchange resin arranged upstream, in the present invention.

Examples of the microparticle removal membrane having the function of removing microparticles include microfiltration membrane (MF membrane), nanofiltration membrane (NF membrane), ultrafiltration membrane (UF membrane), and reverse osmosis membrane (RO membrane) Among them, MF membrane and UF membrane are preferably used from the viewpoints typically of removing ability.

The thickness of a skin layer in the microparticle removal membrane is preferably from 10 to 500 μm, and especially preferably from 50 to 200 μm. A microparticle removal membrane, if having a skin layer with a thickness of smaller than 10 μm, may be unendurable in view of its strength and may suffer from breakage. A microparticle removal membrane, if having a skin layer with a thickness of larger than 200 μm, may cause a large pressure loss.

According to the present invention, the membrane filter having the function of ion exchanging may be pleated. On the other hand, the membrane filter having the function of ion exchanging and the microparticle removal membrane may be superposed to form an assembly and the assembly may be pleated.

Figure 2:
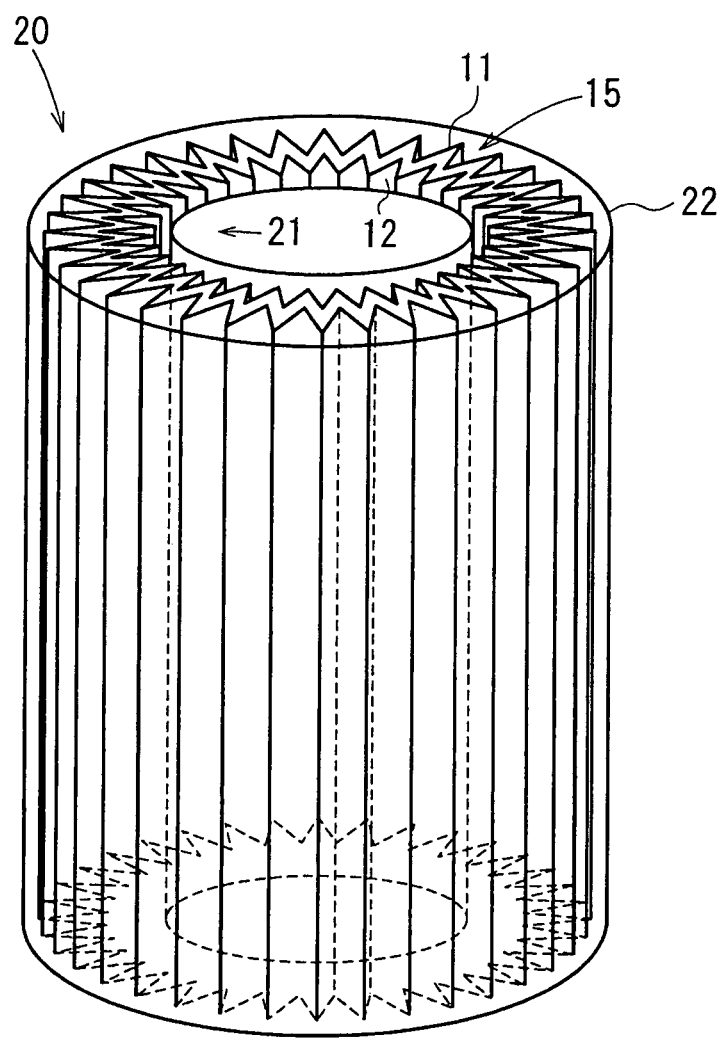
FIG. 2 is an angular perspective view of a filter module.

FIG. 2 is a perspective view of a membrane assembly 15, in which a membrane filter 11 having the function of ion exchanging and a microparticle removal membrane 12 are superposed, pleated, and then rolled into a cylinder. The microparticle removal membrane 12 is arranged inside of the membrane filter 11. The membrane assembly 15 is arranged between a water-permeable inner cylinder (bobbin) 21 and a water-permeable outer cylinder (bobbin) 22 so as to surround the inner cylinder 21. The inner cylinder 21 and the outer cylinder 22 are coaxially arranged. The inner cylinder 21 and the outer cylinder 22 may be ones having many pores being opened or may be porous sintered compacts of ceramics or metals.

A filtration element 20 composed of the membrane assembly 15, the inner cylinder 21, and the outer cylinder 22 can be used in the same manner as the ion exchange filter 6 in FIG. 1.

Figure 3:
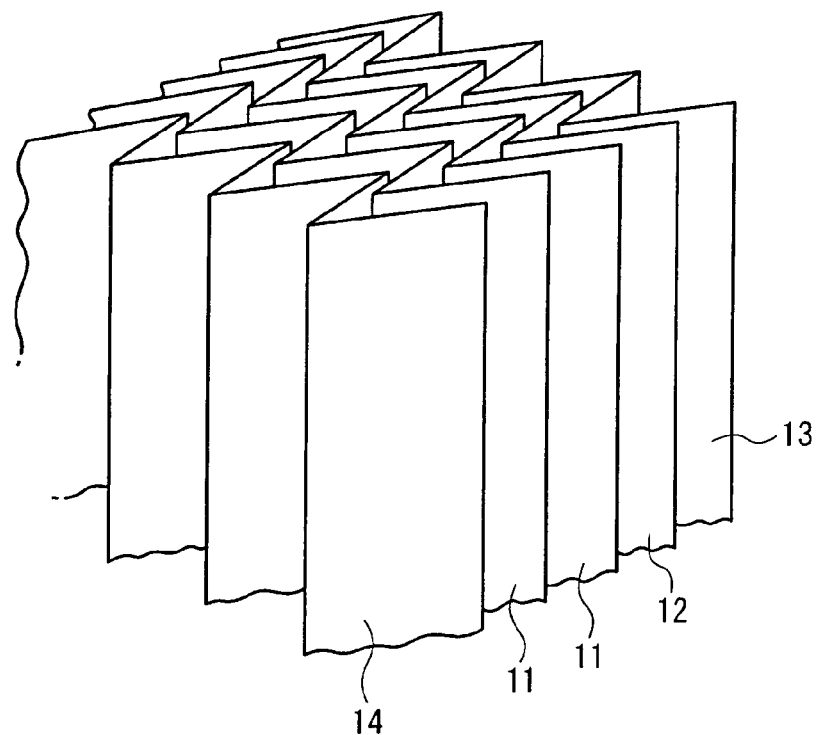
FIG. 3 is a schematic perspective view showing the assembly structure of a filtration element.

The membrane assembly may have supports 13 and 14 which are composed of water-permeable membranes and are arranged on inner and outer circumferential sides thereof, as illustrated in FIG. 3. The supports 13 and 14 herein are superposed on the membrane filter 11 and the microparticle removal membrane 12, respectively, and then pleated. In an embodiment in FIG. 3, two plies of the membrane filter 11 having the function of ion exchanging are superposed, but the number of plies of the membrane filter may be one or may be three or more.

Figure 4:
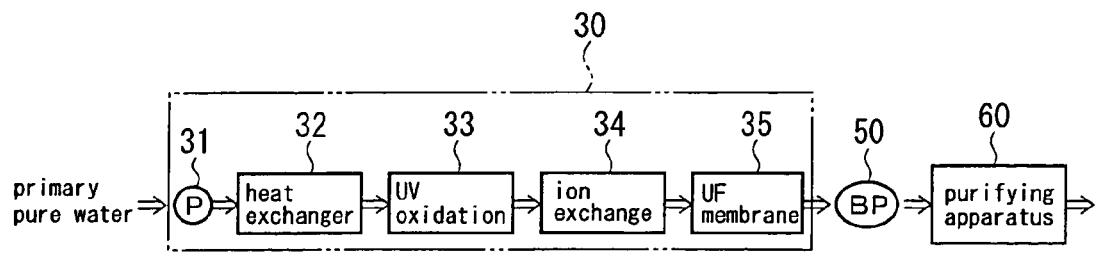
FIG. 4 is a flow chart of a process for producing ultrapure water.
Figure 5:
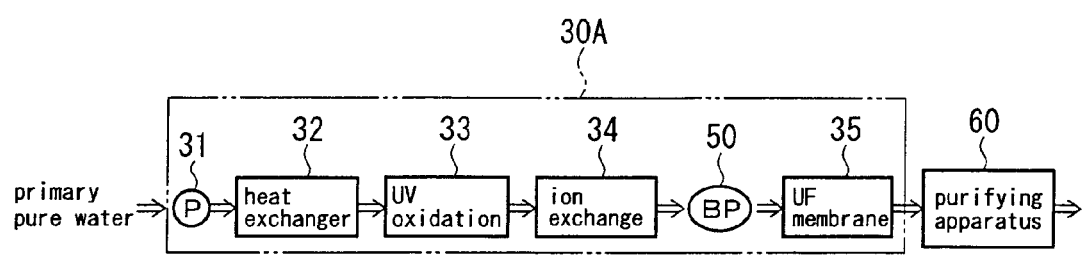
FIG. 5 is a flow chart of another process for producing ultrapure water.

FIGS. 4 and 5 show exemplary flow charts of processes for producing ultrapure water using the purifying apparatus according to the present invention.

In an exemplary flow in FIG. 4, primary pure water is allowed to pass through a subsystem 30, pressurized by a booster pump 50, fed to the purifying apparatus 60, and the resulting ultrapure water is fed to a point of use. The subsystem 30 includes a pump 31, a heat exchanger 32, an ultraviolet-ray (UV) oxidation device 33, an ion exchanger 34, and an ultrafiltration membrane (UF membrane) system 35, and these are connected in series.

In another exemplary flow in FIG. 5, a booster pump 50 is arranged in the midway of a subsystem 30A. In this embodiment, the booster pump 50 is arranged between an ion exchanger 34 and an ultrafiltration membrane (UF membrane) system 35, but it may be arranged at another position. With reference to FIG. 5, water from the subsystem 30A is treated in the purifying apparatus 60 and fed to the point of use. The other configuration of the flow chart in FIG. 5 is the same as with that in FIG. 4, and the same reference numerals refer to the same components, respectively.

As materials for the booster pump, especially for its part that is in contact with water, metallic materials are not preferred because heavy metals can leak therefrom, but materials that do not suffer from ion leakage, such as PVDFs, are preferred. For the same reason, the booster pump is preferably a vortex pump or magnet pump.

The booster pump can be arranged at any position, as long as being upstream of the apparatus according to the present invention, but it is preferably arranged upstream of the UF membrane of the subsystem so that dissolved oxygen derived from the booster pump is removed by the UF membrane. In this case, the UF membrane should be one that is endurable against pressure (5 to 12 MPa). By configuring thus, microparticles leaked from the booster pump can be removed by the UF membrane. More preferably, a degassing membrane is arranged between the booster pump and the UF membrane so as to remove dissolved oxygen further reliably.

EXAMPLES

The present invention will be illustrated in further detail with reference to several examples and comparative example below. It should be noted, however, these are never construed to limit the scope of the present invention.

In the following examples and comparative example, the ultrapure-water purifying apparatus illustrated in FIG. 1 was used.

Example 1

A cation exchange resin "EX-CG" (supplied by Kurita Water Industries Ltd.) was sequentially conditioned with hydrochloric acid and then with ultrapure water and charged into the lower chamber 1a of the ultrapure-water purifying apparatus 10 in FIG. 1.

In the apparatus in FIG. 1, a filtration element having the structure shown in FIG. 2 was used as the ion exchange filter 6, this was sequentially conditioned with hydrochloric acid and then with ultrapure water, and arranged in the upper chamber 1b of the ultrapure-water purifying apparatus 10 in FIG. 1. In the filtration element, the outer cylinder 22 has an inner diameter of 80 mm and a height of 210 mm, and the inner cylinder 21 has an outer diameter of 40 mm and a height of 210 mm.

In the pleated membrane assembly used herein, a polystyrene grafted with sulfonic groups was used in the ion exchange membrane, and a polystyrene porous membrane was used in the microparticle removal membrane. The number of pleats in the pleated membrane assembly is 70.

The outer circumferential edges of the pleated assembly are in contact with the inner circumferential surface of the outer cylinder 22, and the inner circumferential edges of the pleated assembly are in contact with the outer circumferential surface of the inner cylinder 21.

Next, a sample water was prepared by adding a sodium ion standard solution, for use in ICP-MS analysis, to ultrapure water to a sodium concentration of 1.0 ng/liter, and the sample water was introduced through the water inlet 2 into the purifying apparatus 10 at a rate of 20 liters/minute. Then, the sodium ion concentration of water discharged from the outlet 3 was analyzed.

As a result, the number of days before breakthrough occurred, namely, the number of days before the sodium concentration of the outlet water reached the same level before introduced into the purifying apparatus 10, 1.0 ng/liter, was 468 (days).

Comparative Example 1

A test was carried out by the procedure of Example 1, except for not using the cation exchange resin.

As a result, the number of days before breakthrough occurred, namely, the number of days before the sodium concentration of the outlet water reached the same level before introduced into the purifying apparatus 10, 1.0 ng/liter, was 3 (days).

Example 2

A purifying apparatus was prepared as in Example 1, except for setting the number of pleats to be 40. A sample water was allowed to pass through the resulting purifying apparatus by the procedure of Example 1, and the number of days before breakthrough occurred was found to be 124 (days).

While the present invention has been shown and described in detail with reference to specific embodiments thereof, it will be understood by those skilled in the art that various changes and modifications may be made without departing from the spirit and scope of the present invention.

The present application is based on a Japanese Patent Application (Japanese Patent Application No. 2006-296123) filed on Oct. 31, 2006, the entire contents of which being incorporated herein by reference.

The invention claimed is:

1. An apparatus for purifying ultrapure water, which is connected to an ultrapure-water inlet of an institution in which the ultrapure water is to be used, wherein the apparatus comprises:
   a subsystem which produces ultrapure water, comprising:
      a UV oxidation unit;
      an ion exchange unit; and
      an ultrafiltration membrane system connected in series so that the ultrapure water is provided by the subsystem; and
   a purifying device which is separate from the subsystem and connected to the subsystem to receive the ultrapure water therefrom, the purifying device comprising:
      an ion exchange resin layer including a granular ion exchange resin comprising a cation exchange resin alone or in combination with an anion exchange resin, the ion exchange resin having a particle diameter of 100 μm or more;
      an ion exchange filter arranged downstream from the ion exchange resin layer and including an ion exchanging membrane filter to remove metal ions and other impurities unremoved by the ion exchange resin layer, and a microparticle removal membrane arranged downstream from the ion exchange membrane filter to remove microparticles; and
      a housing retaining the ion exchange resin layer and the ion exchange filter so that further purified ultrapure water is provided by the purifying device,
   wherein the housing comprises an elongate vessel,
   the vessel having:
      an inlet at a bottom of the vessel for receiving ultrapure water from the subsystem;
      a resin bed at the bottom of the vessel containing the ion exchange resin, the resin bed having perforated plates at the upstream and downstream ends thereof so that ultrapure water from the inlet passes through the resin bed;
      an upper chamber in constant fluid communication with a downstream end of the resin bed, the ion exchange filter being disposed in a central portion of the upper chamber so as to define an elongate hollow center into which water from the upper chamber permeates via the ion exchange filter; and
      an outlet in constant fluid communication with the hollow center, and
   the ion exchange filter is arranged in the housing to form an open space between an inner surface of the housing and an outer surface of the ion exchange filter.

2. The apparatus for purifying ultrapure water, according to claim 1, wherein the membrane filter is pleated.

3. The apparatus for purifying ultrapure water, according to claim 1, wherein the membrane filter having the function of ion exchanging and the microparticle removal membrane are superposed to form an assembly, and the assembly is pleated.

4. The apparatus for purifying ultrapure water, according to claim 2, wherein the purifying device further comprises a water-permeable inner cylinder and a water-permeable outer cylinder which are coaxially arranged, and wherein the pleated membrane filter is arranged between the inner cylinder and the outer cylinder so as to surround the inner cylinder.

5. The apparatus for purifying ultrapure water, according to claim 3, wherein the purifying device further comprises a water-permeable inner cylinder and a water-permeable outer cylinder which are coaxially arranged, and wherein the pleated membrane filter having the function of ion exchanging and the microparticle removal membrane is arranged between the inner cylinder and the outer cylinder to surround the inner cylinder.

6. The apparatus for purifying ultrapure water, according to claim 1, wherein a booster pump for pressurizing water to be fed to the ion exchange resin layer is arranged upstream of the purifying device.

7. The apparatus for purifying ultrapure water, according to claim 1, wherein the subsystem further comprises a heat exchanger and a primary pump upstream of the heat exchanger.

8. The apparatus for purifying ultrapure water, according to claim 7, wherein the subsystem further comprises a booster pump disposed on one of an upstream side and a downstream side of the ultrafiltration membrane system.

9. The apparatus for purifying ultrapure water, according to claim 6, wherein the subsystem further comprises a degassing membrane disposed downstream of the booster pump to remove dissolved gas from an output of the booster pump.

10. The apparatus for purifying ultrapure water, according to claim 8, wherein the subsystem further comprises a degassing membrane disposed downstream of the booster pump to remove dissolved gas from an output of the booster pump.

11. The apparatus for purifying ultrapure water, according to claim 1, wherein the perforated plates are fixed to an inside of the housing.

12. The apparatus for purifying ultrapure water, according to claim 1, wherein
   the housing has a protrusion integrally formed on a top of the housing, and
   the outlet is formed on the protrusion.

13. The apparatus for purifying ultrapure water, according to claim 12, wherein the open space extends from a bottom of the protrusion to a top surface of the perforated plates.

* * * * *